United States Patent Office 3,336,246
Patented Aug. 15, 1967

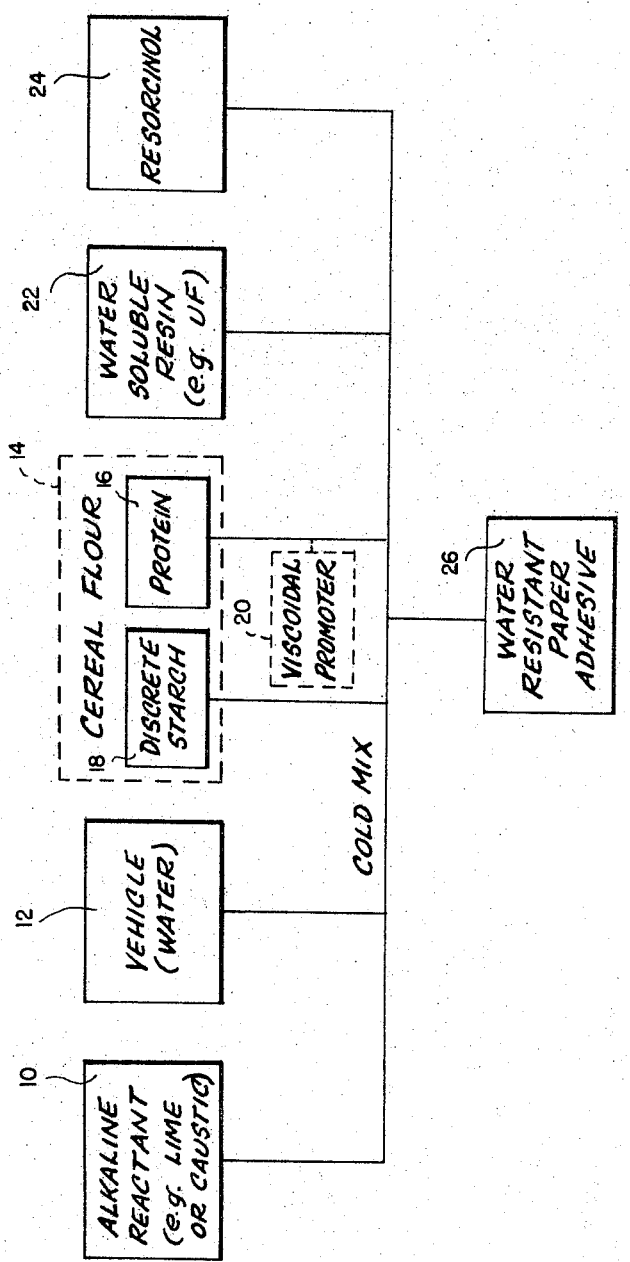

3,336,246
PAPER LAMINATING ADHESIVE COMPOSITIONS CONTAINING RESORCINOL
Alexander J. Golick, Seattle, and John T. Stephan, Longview, Wash., assignors to Westix Corporation, Longview, Wash., a corporation of Washington
Filed Feb. 11, 1966, Ser. No. 526,753
25 Claims. (Cl. 260—6)

This application is a continuation-in-part of my copending and now abandoned application Ser. No. 844,722, entitled, Paper Laminating Adhesives, Materials and Processes Concerning Same, and Products Formed Thereby, and filed Oct. 6, 1959.

This invention relates to cold mixed, fast settable adhesives for bonding thin porous and/or fibrous materials, laminating paper products, or laminating paper to wood, metal, porous, or fibrous materials and the like where enhanced water resistance is desired. More particularly the present invention relates to adhesives as employed on high-speed bonding machines for the production of paper products, such as corrugated paper board, laminated fiberboard, paper covered veneer, and the like, the resultant bond being highly satisfactory from the point of view of laminated product water resistance and production speeds, the adhesive system characteristic of the invention nonetheless being inexpensive, easy to prepare and easy to handle in use.

Historically, early paper corrugating adhesives commercially involved a sodium silicate or like inorganic aqueous solution, with the adhesive setting by accelerated evaporation loss of the solvent vehicle through application of heat. A first major change in this commercial practice came in about 1935, involving an adhesive and process such as that disclosed in Bauer U.S. Patent No. 2,102,937 for example, wherein is disclosed a discrete starch dispersed in a premixed alkaline carrier containing gelatinized starch. To prepare the Bauer adhesive, an isolated starch such as cornstarch or tapioca starch is suspended in about five times its weight of water, then about 10% caustic soda (based on the dry weight of the starch) is added, and the mixture is heated to about 150° F. or higher up to 195° F. to cause gelatinization of the starch, resulting in a viscous aqueous alkaline starch dispersion which is then used as the carrier or vehicle for the discrete or ungelatinized starch. The vehicle thus prepared is cooled to about 100° F., then the discrete starch is added in sufficient amount to give an adequately fast set with heat in the bonding machine, such as a paper corrugating machine. The Bauer composition inherently requires two separate mixing stages with application of heat in first or premix state of preparation of the adhesive, and with the adhesive solution containing sufficient caustic to give a pH of about 10.5 to about 12.0. The resulting adhesive bond, using the Bauer formulation, also has disadvantageous characteristics in terms of narrow gelatinization temperature range, and of not being adaptable to formulation as a dry mix because of the necessity for a liquid dispersion vehicle and because of an inherent tendency in a caustic containing dry mix for "spot" gelatinization to occur. Also importantly, the Bauer adhesive is usually gel-like at temperatures below about 105° F. and therefore requires constant temperature control, and during storage must be thermostatically controlled to provide suitable flow properties. At these elevated temperatures the tendency toward premature gelatinization in production equipment is aggravated. In the present cold-mix system, the liquid adhesive temperature is considerably below that of the Bauer system and therefore provides a greater margin of safety under commercial use condition. Also, and of extreme importance in many applications, is the fact that the Bauer adhesive has no water resistance either when hot-set or dried by evaporation, a glued product bonded with the Bauer adhesive being subject to complete delamination in about 5 minutes when immersed in water. Further, the Bauer formulation is not compatible to economical addition of water-resistance imparting ingredients such as urea formaldehyde resin.

Operationally important advantages characteristic of the adhesive system are also found in the manner of use thereof. Keeping in mind that it is customary to maintain a conventional adhesive at an elevated temperature during use in order that its flow properties be suitable for handling on production equipment, it is important to note that the adhesive system of the present invention is deliverable and handleable on production equipment while at room temperature, i.e. in the so-called "cold" condition. Cold handling of the adhesive creates an operating condition where the temperature differential between the equipment and the adhesive is generally greater, with a corresponding reduction in the tendency of the adhesive to prematurely gelatinize. Further, the inherently greater stability and lower handling temperature of our adhesive while being handled makes possible a reduction in the average gelatinization temperature at which the equipment is operated without danger of premature adhesive gelatinization. As direct consequences of a lower average gelatinization temperature, the heating cost requirement for the equipment is reduced, its production speed potential is increased, and any tendency of the product to shrink or warp due to excessive drying in the final stages of the forming equipment is also reduced. Also, a characteristic of our adhesive system which is of fundamental importance to the art is the fact that the water resistant complex is formable even at room temperature, in direct contrast to certain previous water resistant modifications of the Bauer adhesive system, where elevated temperatures maintained for substantial times are necessary to develop water resistant properties. As a consequence of the capability of our adhesive system to form the water resistant complex at a lower temperature, production runs can be made at lower average gelatinization temperatures without loss or adverse compromise of water resistant properties, the operating balance between average gelatinization temperature and production speed when using the adhesive system of the present invention being determined essentially only by the temperature and setting time necessary to get a dry bond.

Bauer U.S. Patent No. 2,102,937 is also of interest to an understanding of some of the considerations involved with respect to the present invention, because of its description of a typical form of commercially used apparatus for forming corrugated paper board. Briefly, such equipment includes three supply rolls of paper, the paper from one supply roll passing through two meshing corrugating rolls, the fluted paper becoming subsequently the core or center ply of the formed corrugated paper board. In such apparatus, the fluted core after its formation on the heated corrugating rolls then passes an adhesive applicator roll engaging the peaks or "nips" of the fluted paper along one side thereof, after which the paper liner from a second supply roll is applied to the adhesive coated flutes or nips. In such a machine, the core and liner pass around a heated drum, the temperature of the drum being commonly about 375° F., with the time on the drum at satisfactory commercial production speeds being only about $\frac{1}{30}$ of a second.

Since the corrugating rolls are heated, a partial setting of the adhesive occurs between the core and the liner almost instantaneously, i.e. while said core and said liner are on the heated roll. The core and liner thus bonded are next passed over the return pass roller, a second adhesive covered roll applying adhesive to the nips on the other side of the core, after which a second liner is fed onto the adhesive coated nips from the third supply roll of the machine, thus completing both sides or liners of the formed paper board. After being thus fabricated, the formed paper board passes under belt pressure over a steam heated hot plate stage of suitable length to insure set of the adhesive bond between the core and the second liner. In existing commercial equipment, the hot plate or like heater is maintained at about 375° F. and is of sufficient length to maintain the heat on the formed corrugated paper board, and particularly the second liner thereof, for about five seconds, it being necessary to provide more heating time for developing adequate adhesion in the second liner bond, as compared with the first liner bond, because of the enclosed nature of the formed board and since the curing heat is applied from one side only.

During World War II, the necessity for water resistant laminated paper products became pronounced, and the quest for satisfactory water resistant board resulted in addition of various resin forming materials to the Bauer formulation. The first proposed solution involved the adoption of acid pH conditions in the adhesive solution, rather than alkaline conditions, in order to permit adequate polymerization of the urea-formaldehyde resin employed to impart water resistance to the formed adhesive bond. Such an adhesive system, involving the use of urea-formaldehyde resin, is disclosed in Ceaser et al. U.S. Patent No. 2,463,148 for example. Such system involves a pH of about 5.0–6.5, and and proved comparatively quite slow in terms of commercial production speeds (with about 225 feet per minute a practical maximum), primarily because of the high temperature requirement for gelatinization of the discrete starch ingredient under the acidic conditions necessary for polymerization of the resin. In an attempt to increase the production rate of water resistant corrugated board, the pH of the adhesive was then raised upward onto the alkaline side in order to lower the gelatinization temperature of the suspended raw starch but this impaired water resistant properties because a change of the pH to the alkaline side slowed down the polymerization of the acid-curing urea-formaldehyde resin with resulting lower degree of water resistance in the finished board. Whereas such alkaline urea-formaldehyde starch combinations permit normal high production speeds for the development of an adequate dry bond, additional heat is required to develop the necessary degree of water resistance. This inconsistency was compromised by using slower machine throughput speeds as compared with the non-water resistant alkaline systems to gain the necessary higher bonding temperatures. Further attempts to resolve the problem of developing adequate water resistance in high speed paper laminating adhesives have involved incorporating in the common alkaline Bauer type adhesive an alkaline curing ketone-formaldehyde type resin to promote faster polymerization in the faster setting more alkaline starch adhesive system, such as is disclosed in Scrutchfield U.S. Patent No. 2,529,851. Similarly a resorcinol-formaldehyde type resin alkaline starch system is disclosed in Kesler U.S. Patent No. 2,626,934 and Kesler et al. U.S. Patent No. 2,650,205. Characteristically, these types of adhesive systems involve a low solids content, the presence of sodium hydroxide or similar alkali metal hydroxide (with resulting pH of about 9–12), a heat gelatinized starch or dextrin carrier, a discrete starch, and comparatively expensive resin materials. In these adhesive systems, presence of substantial amounts of alkali metal caustic is necessary to give a sufficiently low viscosity and high pH to the carrier portion of the system for flowability and to lower the gelatinization temperature of the discrete starch ingredient to the point where the discrete starch can gelatinize sufficiently fast in the bonding process to permit satisfactory production speeds. It is generally recognized, however, that the presence of a substantial amount of one or more highly water soluble alkali metal salts is deleterious to the water resistance properties of the dried adhesive bond, since the dried highly water soluble alkali metal salts present in the dry adhesive film redissolve rapidly when exposed to water, thereby weakening the bond. It is surprising therefore to discover that the addition of a urea-formaldehyde resin, together with resorcinol to alkaline aqueous cereal flour mixes produces an adhesive capable of producing a higher water resistance bond.

In contrast to earlier attempts to suitably comprise the various apparently incompatible conditions and considerations as to starch containing paper laminating adhesive systems to obtain adequate water resistance consistent with high production speeds and low material cost, the present invention avoids and in many respects effectively obviates the necessity for such compromises.

The present invention involves a paper laminating alkaline aqueous adhesive system where the primary, potentially adhesive ingredient is a viscoidal, proteinaceous, ungelatinized starch containing material in particulate form, such as a cereal flour or the like, compounded with a liquid, water dispersible or water soluble resin constituent, such as an amino-aldehyde liquid resin capable of forming in the formulation environ of the system a nonreversible, colloid type, reaction product in the dried adhesive bond. The formulation further includes, as essentially the only inorganic reactant, an alkaline reactant with sufficient water solubility to autogenically give a pH in water solution of at least about pH 9, such alkaline reactant advantageously being an alkaline earth metal hydroxide forming material or an alkali metal hydroxide forming material, especially advantageous commercial forms thereof being calcium hydroxide and sodium hydroxide. Such alkaline reactant acts to accomplish the following functions; (1) to effectively disperse the protein constituent, (2) to impart to the adhesive solution a pH which provides a favorable gelatinization condition for the discrete starch constituent of the cereal flour, and (3) to enter into reaction with the protein and starch constituents of the flour as well as the resin and resorcinol constituents of the formulation and produce the aforesaid nonreversible, colloid type, water resistant reaction product in the dried adhesive bond.

In general terms and as shown diagrammatically in the block diagram presented in the accompanying figure, the water resistant adhesive system of the present invention involves cold mixing of an alkaline reactant 10, such as lime or caustic soda with an aqueous vehicle such as water 12 and a proteinaceous, ungelatinized starch containing material in particulate form such a cereal flour 14 having a protein constituent 16 and a discrete starch constituent 18. Such cereal flour may be of a type giving a viscoidal dispersion in an aqueous mix or, as appropriate, the protein constituent 16 of the cereal flour can be rendered viscoidal by addition of a viscoidal promotor 20 such as sodium bisulfite or calcium bisulfite solution while mixing the ingredients. In a manner more fully discussed in connection with subsequent examples, the formulation further includes a liquid, water soluble resin, such as urea formaldehyde resin 22, for example, and a beneficiation agent 24 such as resorcinol. On cold mixing with the other ingredients the resin and resorcinol constituents produce a paper adhesive 26 which is characterized by a cold-setting capability and by a high degree of water resistance. More detailed and further variations as well as other compatible additives and ingredients which can be incorporated into the alkaline-protein-starch-resin-resorcinol adhesive system will be apparent from the following more detailed discussion thereof and from the subsequent examples.

In contrast to the customary utilization of isolated starch of one form or another as the potentially adhesive material in the paper laminating adhesive system, the adhesive system of the present invention utilizes a different form of potentially adhesive material, notably a cereal flour or equivalent compounded mixture of protein and natural or refined starch constituents, and functionally turns to advantage both the starch constituent and the protein constituent of the system.

By the term "viscoidal, proteinaceous, ungelatinized starch containing material in particulate form," the present invention contemplates that such potentially adhesive material be any more or less finely ground cereal flour or like starch and protein containing flour with or without the bran and/or germ. Suitable cereal and like flours, which are also termable cereal type flours, include wheat flour, rye flour, oat flour, barley flour, millet flour, corn flour, sorghum flour, milo flour, pea flour, potato flour and the like, containing protein in substantial proportion, say at least about 3% on a dry weight basis, also containing discrete starch in the amount of from about 50% to about 85% on a dry weight basis, and further containing various soluble gummy substances in incidental amounts. Further included in such generic term denoting the potentially adhesive primary material in the formulation of the adhesive of the invention are mixtures of various flours, it being often possible and commercially practical to fortify the protein content of a low-protein cereal flour by adding thereto a non-cereal or leguminous flour or the like, also termable leguminous type flours, such as soybean flour, peanut meal flour, cottonseed meal flour, safflower meal flour, mixtures thereof, and the like. An isolated protein such as the proprietary product Alpha-Protein is an equally suitable protein fortifier. Also, certain animal proteinaceous materials such as blood albumen, animal glue, casein in its soluble and insoluble forms, fermentation residues from the beer and antibiotic industries, pulp residue from beet sugar manufacture, and mixtures of any such similar natural materials can be used to fortify the protein content of a cereal flour, as described. As is known in the cereal flour arts, cereal flours vary considerably in their capacity to give viscous type flow, (i.e. being viscoidal) when dispersed in water, as distinguished from glutinous or plastic type flow. For example, rye flour and about half of the available wheat flours are capable of giving substantially viscous flow in our formulations without any pretreatment. However, some wheat flours and certain various other protein and starch containing materials which naturally have more or less of a tendency toward plastic flow can be rendered viscoidal by pretreatment with a water soluble sulfide, sulfite or bisulfite salt, such as sodium sulfite, in a manner known per se, as in Clark U. S. Patent No. 2,580,890, for example. Such pretreated flours and the like are to be considered within the scope of the above quoted terminology, the modification of the material to develop viscous type flow on dispersing of the material in water solution being identifiable with the "viscoidal" characteristic such terminology presents. Further, it is to be recognized that various artificial formulatons of a protein-containing and a starch-containing material or materials is possible within the scope of the quoted terminology and is within the skill of those in the art.

Viscosity modifying materials may be included such as British gums, dextrins, soluble starches, pre-gelatinized starches, oxidized starches, borated dextrins, enzyme modified starches, water soluble natural gums, water soluble cellulose compounds, water soluble synthetic polymers, and the like. Various fine ground inorganic filler materials such as china clay, bentonite, gypsum, silica, diatomaceous earth, whiting, and the like can be incorporated and in some circumstances provide additional stiffness in the finished board as well as aiding in the control of the viscosity of the adhesive. Various organic fillers such as fine ground shell flours, wood flour, cellulosic fibers, bark fractions, agricultural residues, and the like can also aid in viscosity control and also in the control of the penetration properties and the bonding power of the adhesive. Additionally, emulsive water repellants such as wax emulsions, resin emulsions, polyvinyl acetate emulsions, wood rosins and derivatives thereof such as Vinsol, and mixtures of such emulsions can be incorporated in a given adhesive system with various beneficial effects in water resistance, flow characteristics, tackiness, plasticity of the bond, and extent of penetration, for example. Wetting agents can also be employed, as desired. Preservatives such as borax and the chlorinated phenols are also preferably included in a manner known per se in the art.

The alkaline hydroxide forming material employed as the sole inorganic reactant in the adhesive system of the present invention functions as a gelatinization agent, and by definition is to be understood as including sodium oxide and sodium hydroxide (caustic soda) and the various other alkali metal hydroxide forming materials, specifically potassium oxide and hydroxide, lithium oxide and hydroxide, and mixtures of these various alkali metal hydroxide forming materials. Also included are the various alkaline earth metal hydroxide forming materials, specifically calcium oxide and calcium hydroxide, strontium oxide and strontium hydroxide, barium oxide and barium hydroxide, and mixtures thereof. Beryllium hydroxide and radium hydroxide are not included because of toxicity and expense, while zinc hydroxide, magnesium hydroxide, cadmium hydroxide, and mercuric hydroxide are not included because each is either relatively water insoluble or has insufficient effectiveness on water resistance.

As is well recognized, commercial grades of various alkaline hydroxide forming materials, such as contemplated by the present invention, often include more or less minute amounts of impurities. The usual commercial grades of alkaline hydroxide forming materials have been found satisfactory for the purposes of the present invention, and the foregoing considerations with respect to this ingredient of the instant formulations are not to be construed as preventing use of commercial grade forms of the alkaline hydroxide forming materials involved.

Certain alkali metal salts such as sodium tripolyphosphate, tetra-potassium-pyrophosphate, sodium hexametaphosphate, and the like, have a very beneficial effect on the flow and adhesive properties of the finished adhesive containing appropriate percentages of these salts.

In defining the resin constituent of the formulation in the present invention, the terminology "urea aldehyde liquid resin" is to be construed as including any liquid, water soluble urea aldehyde resin and like amino aldehyde resins, including amino aldehyde resinous reaction products in which minor portions of other materials reactive to aldehydes, such as ammonia, mono-ethanolamine, ethylene diamine, di-ethylene triamine, tri-ethylene tetramine, tetra-ethyline-pentamine, glycine, and the like may be present either in chemically reacted or unreacted form. It is to be noted that phenol aldehyde and resorcinol aldehyde resins are generally excluded, the latter types of resins being apparently inoperable of themselves because of lack of the appropriate polyfunctional reactive linkages to form the irreversible colloid type of protein-starch resin-resorcinol complex characteristic of the invention.

While the exact chemical and physical phenomena involved have not been fully explored, it is hypothecated that the protein, starch, resin and resorcinol on setting form a complex characterized by sharp increase in protein molecular size and an irreversible gel system, presumably because of at least partial cross linkage condensation or like phenomena.

That the resin constituent does not form a reaction product by cross-linkage in the usual way is indicated because many of the operable resin constituents in the environ of the present invention are of the type that will not form the usual type of condensation reaction product under the alkaline conditions presented by the adhesive system here involved.

It is further theorized that the ungelatinized starch ingredient functions at least primarily as an adhesive setting promoter, i.e., to rapidly bind the water of solution by gelatinization of the starch during passage of the heated laminated product through the forming machine. That an irreversible colloid is formed from the aqueous adhesive of the invention is shown by applying the aqueous adhesive formulation of the present invention to form a bond between laminated paper, then permitting the bond to cold set (by evaporation of the aqueous vehicle), after which the resulting, dried, adhesive bond is found to have a surprising degree of water resistance and bond strength properties, even though the laminate was not subjected to any heating whatsoever and even though the discrete starch constituent of the cereal flour remains entirely ungelatinized. This indicates that an interreaction of the resin element and the bursting starch is not completely essential to the development of water resistance.

From the foregoing more or less general considerations and from the following particular examples of practice of the invention, several especial and unique advantages of the invention are noteworthy. One important practical advantage is that for some gluing operations most of the ingredients except the water of dispersion can be premixed in dry form for marketing purposes. Thus, for example, the cereal flour, and an alkaline earth metal hydroxide such as hydrated lime, can be mixed and sold as a dry mix. The formulation at the point of use of the adhesive then merely involves mixing same with water, resin and resorcinol. This procedure is to be contrasted with the previous requirement of preparing a heated, gelatinized starch type carrier in order to get effective dispersion of the potentially adhesive material in sufficiently fluid form.

A second important advantage of the adhesive formulation of the present invention is that such adhesive has a remarkably fast bonding speed, permitting high production rates, which advantage is in turn traceable to the fact that substantially all of the contained starch in the adhesive is in ungelatinized form right up to the time of bond. Yet other advantages are found in the superior water resistance of adhesive bonds in laminated paper products characteristic of the invention, and the low cost of the ingredients making up the formulation and particularly the cereal flour or the like, as compared with the isolated starches now in common use as the primary ingredient for paper adhesive systems. Advantageous also are the development of satisfactory alkalinity for fast setting, consistent with superior water resistance, and the realization of high solids content in the adhesive solution, consistent with a sufficiently low viscosity to render the adhesive solution readily handleable on product forming equipment.

Where an adhesive is to be used on a corrugating machine it is desirable that the flow characteristic of the adhesive be such that the adhesive pumps readily from a storage tank and readily circulates through the applicator glue pans. A thixotropic viscosity or false body is not desirable in such an adhesive. Generally speaking the viscosity should be as low as possible to facilitate spreading but not so low as to be thrown off a rotating applicator roll. Glue which is thrown off the applicator is not only wasted but builds up on the mechanical equipment necessitating frequent shutdown for cleaning. Plastic flow as distinguished from viscous flow is always present to a degree where solid particles are suspended in a liquid medium. In all of the compositions of the present invention solid starch particles are present suspended in a viscous proteinaceous carrier. Such systems always show plastic flow to a degree depending on the percentage of solid particles present. The higher the concentration of particles the more pronounced is the tendency toward plastic flow. The size and shape of the particles as well as their electrical charge have an important bearing on the flow characteristic as is well known and already elucidated in standard rheology texts.

When a cereal flour is mixed with water a dough is first formed. The plastic-viscous properties of this dough are evident to anyone who has ever kneaded bread or baked a cake. Some flours are smoothly viscous and string out when flowing off a spatula, while others are "short" and tend to fall off of a spatula in chunks. Flours which are smoothly viscous tend to spread better from roll applicators. A typical flour miller's description of one type of wheat flour which gives a smooth viscous dispersion is what is known as a "Winter wheat, second clear." This is a term which describes the kind of grain and the particular portion of the grinding operation in a conventional roller mill flour mill where the second clear wheat flour has been "cut" or segregated from the total grind. Most flour for cooking and baking purposes is milled on multiple roller mills. The United States Food and Drug Administration has established six classes of wheat flour. They are (1) flour, (2) enriched flour, (3) self-rising flour, (4) phosphated flour, (5) bromated flour, and (6) whole wheat flour. All of these, except (6) whole wheat flour, are white flours and are often called "patent" flours. Any of these can be made from soft wheat or hard wheat. The higher gluten content of the hard wheats entraps more gas bubbles during the leavening process and makes a better rising bread. Flour from soft wheats is used chiefly for biscuits, cake, pastries, and baking flours.

Wheat is made into flour by a process called milling. The endosperm or white inner part of the kernel is separated from the bran or outer layer of the wheat kernel and from the germ by multiple grindings on roller mills and siftings.

In milling, the wheat grain is first cleaned to remove all dirt, rubbish, weed seeds, chaff, straw, etc. The clean grain is then washed, during which the bran becomes tempered or made less brittle. The grain is then passed through crushing rolls which crack the grain and loosen the bran and germ from the endosperm. The broken pieces are then separated from each other by sieving. The crushing and sieving are repeated until as much as possible of the bran and germ are separated from the flour. After the first grinding the crushed wheat is separated by sieving into "first break flour," middlings, and bran. Each succeeding grinding roll is set up to grind finer and finer. After each grinding the middlings are usually separated from the bits of bran contained therein by air separation methods. The purified middlings are then ground on a finer mill to form a white flour. About 70–75# of white flour, also called "straight flour," is recovered from 100# of wheat grain. Straight flour is further graded into four grades: (1) patent, (2) first clear, (3) second clear, and (4) low grade. Patent flour is the most expensive and makes the whitest bread. The first clear and second clear grades are used for dark colored breads and when mixed with rye flour make rye breads. Second clears and low grades are frequently used for industrial purposes such as in wallpaper paste or for the extension of urea resin plywood adhesives. White or straight flour usually contains from about 5% to about 20% of protein (the protein content being taken as 6.25 times N, the nitrogen content, as determined by the Kjeldahl-Wilfarth-Gunning method). The protein in wheat flour consists of a number of individual protein materials. Two of these in wheat, "gliadin" and "glutenin" are collectively called "gluten" and constitute about 88% of the total protein in the flour. The gluten is the tough, sticky, substance which holds the carbon dioxide bubbles made by the yeast during the bread making and causes the dough to rise. The gluten can be separated from the flour by making a dough from the flour and water and kneading gently under cold running water. The starch granules are washed away until only a creamy sticky mass of gluten is left. The term "gluten" is used for rye and other flours as well as for wheat flour. White rye flour is made in a conventional roller mill process similar to the manufacture of white or straight wheat flour. The baking product known as whole wheat flour or Graham flour contains all of the bran, usually as coarse particles and is generally unsuitable for use in the adhesive of the present invention because of the poor spreading property occasioned by the coarse bran particles. A flour made by hammer milling or impact milling of the whole grain of wheat, rye, barley, and the like to give a fine ground flour containing bran, endosperm, and germ, all of which will pass through a 200 mesh screen, is quite suitable for use in our adhesive. Such a flour has a natural advantage of containing fine ground bran which acts to aid in controlling penetration of the adhesive. In order to be useful a whole ground flour must be ground to a sufficiently fine and uniform mesh size so that good spreading properties result when wet mixed. Flours having a size distribution between about 80 mesh and about 400 mesh are satisfactory, the preferred range of flour particle size being about 100 mesh to about 325 mesh.

In use, the behavior of an adhesive on the corrugator is directly related to the viscosity characteristics of the adhesive resulting from elevation of its temperature. There is a pronounced difference in behavior of a typical Bauer alkaline starch adhesive made according to Bauer U.S. Patent No. 2,102,937 and a typical adhesive according to the present invention. This difference is the range of temperature over which change in viscosity takes place. In the case of the Bauer alkaline-starch adhesive the change in viscosity by virtue of gelatinization of the contained discrete starch takes place over a comparatively narrow temperature range of from about two to about five degrees Fahrenheit, whereas in a typical alkaline hydroxide dispersed wheat flour, with added water soluble resin and resorcinol, the gelatinization induced change in viscosity takes place over a range of from about five to about ten degrees Fahrenheit. This extended gelatinization range is quite probably due to the combination of starch, protein, resin and resorcinol present in the adhesive system.

The gelatinization temperature of an alkaline adhesive containing suspended discrete starch is governed by the pH of the environment. At a given alkaline pH, for example pH 11.0, there is an important difference in the temperature at which gelatinization begins for the typical Bauer alkaline starch adhesive as contrasted with the reaction product of an alkaline dispersed cereal flour, resin and resorcinol of the present invention. Generally speaking, at a given pH level the alkaline hydroxide dispersed cereal flour starts gelatinizing at about 10 to 15 Fahrenheit degrees lower than the Bauer composition.

It is desirable for maximum efficiency in using our adhesives on commercially available corrugators to adjust the gelatinization temperature of the adhesive by adjusting the concentration of alkaline hydroxide and consequently the pH of the adhesive system. For highest production speeds it is desirable to operate at as low a gelatinization temperature as possible consistent with trouble free operation of the adhesive pumping and distribution system and the adhesive applicator. A modern corrugator operating at steam temperatures in the neighborhood of 375° F. provides considerable radiant and conductive heat which heats up the adhesive even though the adhesive may be continuously recirculated from its storage tank some distance from the corrugator to the reservoir pans on the corrugator in order to minimize the heat pickup. An adhesive is normally stored at a temperature above room temperature, usually about 110° F., in order to improve its fluidity and to cut down on the amount of heat transfer which is necessary to effect curing and thereby increase production speeds. This storage temperature can be artificially maintained but more often is the temperature finally attained by the bulk of the adhesive as a result of the heat absorbed in circulating through the corrugator circuit and the heat losses from the bulk storage tank to its surroundings. When an adhesive starts setting up prematurely on a modern corrugator, trouble develops initially at two places, the stripper fingers in contact with the adhesive spreader roll and the exit pipe carrying the adhesive from the reservoir pans back to the main storage tank. As an adhesive increases in viscosity due to premature setting, the thickened adhesive accumulates on the stripper fingers and the glue spread becomes erratic with poor bond in the corrugated board.

If the adhesive prematurely increases sufficiently in viscosity to interfere with the outflow of adhesive circulating between the reservoir pans on the corrugator and the main storage tank, real trouble develops which usually ends with the entire adhesive setting up in the reservoir pans and consequently a total lack of glue bond on the paper. As indicated, two important differences between our adhesive and a typical Bauer alkali metal hydroxide starch adhesive are; (1) the capability of our adhesive to be delivered to and handled on the forming equipment while at room temperature, i.e. "cold," and (2) the range in temperature over which the viscosity increases with increase in temperature. With progressive elevation in temperature, our adhesive develops increase of viscosity more slowly and more uniformly than the Bauer adhesive and consequently is more free from circulator and spreader troubles although it still is fast setting in ultimate bond formation. While our adhesive is generally operative over the pH range of about 9.00 to about 12.5 as measured with standard glass electrode Beckman pH electrometer Model 3D (making no correction for sodium ion), the preferred range for operating on a modern corrugator is between about pH 11.1 to about pH 11.5 corresponding to a gelatinization temperature of about 135° F. to about 145° F.

Various cereal flours differ in the kind and quantity of protein present. As a consequence, they differ in their ability to combine with a given alkaline hydroxide. At a given level of concentration of a given alkaline hydroxide the various cereal flours exhibit different pH's and consequently different gelatinization temperatures. A requisite procedure therefore in adapting a newly obtained cereal flour for use in our corrugating adhesive is to determine the curve showing the variation of pH with concentration of the alkaline hydroxide to be used and also the curve showing the variation in the gelatinization temperature with concentration of the alkaline hydroxide. From these curves it is then possible to choose the proper concentration of the alkaline hydroxide at hand to give the desired gelatinization temperature for the corrugator to be used. The succeeding batches of adhesive can then be quickly checked against the pH versus concentration curve for control purposes.

As will be apparent from various of the following examples, setting forth test data concerning various formulations characteristic of the present invention, as well as other formulations not characteristic thereof, an important feature of the adhesive system of the present invention is that no heating of the solution or pregelatinization of the starch is necessary in the preparation of the adhesive solution prior to utilization of the adhesive in paper laminating equipment.

In connection with the following examples, a number of test considerations are pertinent to quantitative evaluation of adhesives in paper laminating fields. According to art recognized test procedures (TAPPI), a test consideration of water resistance can be described in terms of "fiber failure," usually given in area percentage comparison. If a sample on being soaked in water at 70° F. for 24 hours fails entirely in the fiber of the paper when two laminated pieces are pulled apart, then the adhesive bond can be described as having 100% fiber failure, i.e. as having maximum water resistance. If the failure is entirely in the adhesive bond, then the result can be described as 0% fiber failure, i.e. as having low or no water resistance. If the failure is partly in the fiber and partly in the bond, this result can be described in a percentage of fiber failure, say 30% or 50%, for example and as the case may be, depending upon the comparison of the area of fiber failure with the area of bond failure.

Another test consideration involves "bond strength" of "pull" given in percentage comparison with respect to the strength of the paper itself. An adhesive bond which is at least as strong as the wet paper is characterized as having a 100% bond strength.

A third test consideration is found in the time of set necessary to obtain an adequate dry bond approaching the strength of the paper. Time of set is an important consideration because existing laminated product forming equipment, such as that in widespread use in making corrugated paperboard, involves passage of the formed paperboard through a heater on a double-facer machine, the time of transit of unheated paper through the heater being about 5–15 seconds on the average. Obviously, an adhesive which requires 10 seconds to set can be run through a forming machine only about half as fast as an adhesive which requires but 5 seconds to set.

By gelatinzation temperature is meant the Fahrenheit temperature or range in temperature Fahrenheit at which the first major viscosity increase occurs when determined by elevating the temperature of a 100 gram sample of the wet mixed adhesive contained in a 250 ml. glass beaker immersed in a hot water bath of variable temperature with constant hand stirring using a mercury type thermometer and maintaining not more than 10° F. differential between the temperature of the water bath and the rising temperature of the wet mixed adhesive undergoing test. Practically all of the adhesives tested gelatinize over a range in temperature and in our examples this range is reported by two temperature readings in degrees Fahrenheit, the lower temperature being the temperature at which the major increase in viscosity starts and the higher temperature being that at which the adhesive attains the viscosity of a heavy paste. For example, a gelatinization temperature of 125° F. to 130° F. indicates that the major viscosity increase begins at 124° F. and continues to increase until a paste viscosity is reached at 130° F.

In the following examples, the test procedure involved the preparation and testing of so-called "single-face" specimens. A single-face test specimen has a single fold or flute bonded to a flat sheet, and simulates the bond formed between the corrugated center ply and the facing liner first applied in a corrugating machine. Such single-face specimen is characterized by a comparatively small area of contact in the bond area and by formation under comparatively high pressure so that comparatively more of the adhesive coating is squeezed out of the effective bond area, with the result that such single-face test procedure is particularly stringent.

In detail, the single-face testing procedures involved in the following examples proceeded as follows.

Corrugating medium stock (38# kraft paper) was formed around a mandrel to provide a fold or flute, the tip of the flute was then touched to a 10 mil film of adhesive, then immediately pressed against a liner (90# kraft paper) on a heated platen, and pressed thereon by hand at about 10 lbs. pressure for 10 seconds, the platen being thermostatically maintained at about 375° F. Upon removal from the platen, the dry bond between the liner and the fluted corrugating medium was satisfactory to hold the two together. The specimen was aged for five days at 70° F. and 50% relative humidity before testing for water resistance. The water resistance test consisted of soaking the specimen in 70° F. water for 24 hours. At the end of the soaking time the plies of the test specimen were separated by hand and the percentage of fiber failure and approximate bond strength were noted. As indicated previously, in the event of failure entirely in the glue bond, a rating of 0% fiber failure is assigned to the specimen. In the event the failure is entirely in the paper, the rating of 100% fiber failure is given. A bond strength equivalent to the paper strength itself is rated at 100%.

Quantitatively, it is considered that any given adhesive composition under test, in order to be commercially acceptable in terms of its wet strength properties, should exhibit at least about 50% fiber failure and at least about 50% bond strength in single-face specimens.

*Example I*

A dry mix was made of the following ingredients:

| | Grams |
|---|---|
| Tech. sodium sulfite | 0.4 |
| Tech. sodium chloride | 2.0 |
| Pearl starch | 25.0 |
| Attagel 20 | 5.0 |
| Rye flour | 50.0 |
| Wheat flour | 20.0 |
| Defoamer (polypropylene glycol, M.W. 2000) | 1.0 |

The foregoing dry mixed ingredients were added to 200 grams of water at 70° F. and mixed until the mixture was smooth and homogeneous. To this initial mix was added another 50 grams of 70° F. water and the mixing continued until smooth and homogeneous. Then 2 grams of hydrated lime (calcium hydroxide) suspended in 50 grams of water was added and the mixing continued until smooth and homogeneous. Finally 10 grams of Lauxite UF 111 (a 65% solids, aqueous syrup form of urea-formaldehyde resin) were added and the mixture was further mixed until smooth and homogeneous. The resulting adhesive had a pH of 11.45, a viscosity of 6 when measured with a MacMichael viscosimeter operating at 22 r.p.m. and using a No. 26 wire and a bobbin immersed 3 cm. in the adhesive, this viscosity reading being equivalent to about 120 centipoises at 70° F. The gelation point of the adhesive mix was 135–140° F. The single-face adhesive bond prepared and tested for water resistance according to the single-face test procedure detailed above showed 20% fiber failure and 10% bond strength.

*Example II*

A wet mix adhesive was made similar in all respects to Example I but having added to it 0.5 gram resorcinol, had a pH of 11.42, a gelation temp. of 136–142° F., and a viscosity of 6 on the MacMichael viscosimeter. Single face board was made under the same condition as Example I and tested for water resistance. It showed 90% fiber failure and 100% bond strength. The contrast in wet strength with Example I is striking.

*Example III*

An adhesive composition was prepared exactly as in Example I except that the urea-formaldehyde resin was omitted and 1 gram of resorcinol was added. The pH of the mix was 11.40. The gelation temperature was 144–151° F. and the voscosity was 5 on #26 MacMichael. The single-face adhesive bond prepared and tested as in Example I showed 0% fiber failure and 0% bond strength. This test shows that resorcinol, in the absence of urea-aldehyde or like amino-aldehyde resin, does not impart any water resistance to the adhesive mix.

*Example IV*

An adhesive composition was made exactly as in Example I except that the urea-formaldehyde resin was omitted and 1 gram of 37% formalin was added. The pH of the mix was 11.39, the gelation temperature was 140–147° F. and the viscosity was 5 to 6 on #26 MacMichael. A single face adhesive bond prepared and tested as in Example I showed 0% fiber failure and 0% bond strength. This test shows that the presence of a reactive aldehyde by itself does not improve the water resistance of the adhesive.

Example V

An adhesive composition was made exactly as in Example I except that the urea resin was omitted and 1 gram of resorcinol and 1 gram of 37% formalin were added. The pH was 11.38, the gelation temperature was 142–149° F. and the viscosity was 5 to 6 on #26 MacMichael. The single-face adhesive bond prepared and tested as in Example I showed 0% fiber failure and 0% bond strength. This test shows that the resin forming combination of resorcinol and formaldehyde, in the absence of a urea-aldehyde or like amino-aldehyde resin, does not confer any water resistance to the basic alkaline aqueous laminating adhesive.

Example VI

An adhesive composition was formulated exactly as in Example I except that 1 gram of 3,5-xylenol was added. The pH was 11.39, the gelation temperature was 142–149° F., and the viscosity was 5 on #26 MacMichael. The single-face adhesive bond thus prepared, upon being tested as in Example I, showed 50% fiber failure and 50% bond strength. This test is indicative of the efficacy of the combination of urea-formaldehyde resin and 3,5-xylenol ingredients in conferring water resistance to an aqueous alkaline lamination adhesive, and that at least to a considerable extent 3,5-xylenol is the equivalent of resorcinol for purposes of imparting water resistivity in this type of adhesive system.

The results of the previous examples are tabulated as follows:

Example VII

Thirty grams of fine ground soybean flour ("Soytex," a 40% protein soybean flour) was mixed with 1 gram of defoamer and 120 grams of water at 70° F. until smooth. Stirred with this mix was 4.8 grams of solid sodium hydroxide dissolved in 24 grams of water. Mixing was continued until a very smooth dispersion resulted. The foregoing mix was called Mix A. A suspension was then made of 70 grams of pearl starch (a white corn starch) in 125 grams of 70° F. water and while maintaining efficient stirring Mix A was added slowly to the starch suspension. A smooth mixture of discrete unburst cornstarch suspended in a viscous carrier of alkali dispersed soybean flour resulted. The pH was 11.40 and the viscosity was 5 on #26 MacMichael. The single face adhesive bond prepared and tested for water resistance as in Example I showed 10% fiber failure and 0% bond strength. This test shows that virtually no water resistance is developed in this adhesive composition.

Example VIII

An adhesive composition was made exactly as in Example VII except that at the end of the mixing period 10 grams of a sodium silicate solution (a 29.3% solution of a 1:3.22 ratio sodium silicate) were added and the mixing continued until smooth. The pH was 11.01 and the viscosity was 2½ MacMichael. The single-face adhesive bond prepared and tested for water resistance as in Example I and revealed 10% fiber failure and 0% bond strength, i.e. virtually no water resistance.

Example IX

An adhesive composition was made exactly as in Example VIII except that 1 gram of resorcinol was added in the final mixing step. The pH was 10.78, the viscosity was 2½ on #26 MacMichael. The single-face adhesive bond prepared and tested for water resistance as in Example I showed 20% fiber failure and 0% bond strength. This shows that an adhesive composition consisting of soybean flour, sodium hydroxide, defoamer, unburst cornstarch, sodium silicate, water, and resorcinol, has virtually no water resistance.

Example X

An adhesive composition was made exactly as in Example IX except that 10 grams of a urea-formaldehyde resin (Lauxite UF 111) was added after the resorcinol addition in the final mixing stage. The pH was 10.70 and the viscosity was 3 on #26 MacMichael. The single-face adhesive bond prepared and tested for water resistance as in Example I showed 90% fiber failure and 90% bond strength. This example shows the high degree of water resistance obtained by the combined action of a water soluble urea-formaldehyde resin and resorcinal on a laminating adhesive consisting of unburst Pearl starch suspended in a carrier made up of soybean flour, sodium hydroxide, sodium silicate, and water. This result is wholly unexpected, since resorcinol and urea-formaldehyde resin by themselves are inactive in enhancing the water resistance.

The results of the previous examples are tabulated as follows:

TABLE ONE

| Ex. No. | UF Resin, g. | Lime, g. | Resorcinol, g. | 37% Formalin, g. | 3,5 Xylenol, g. | pH | Gel Pt., °F. | Visc. on #26 MacM | Single-face adhesion, percent | |
|---|---|---|---|---|---|---|---|---|---|---|
| | | | | | | | | | F.F. | B.S. |
| I | 10 | 2 | | | | 11.45 | 135–140 | 6 | 20 | 10 |
| II | 10 | 2 | 0.5 | | | 11.42 | 136–142 | 6 | 90 | 100 |
| III | | | 1.0 | | | 11.40 | 144–141 | 5 | 0 | 0 |
| IV | | 2 | | 1.0 | | 11.39 | 140–147 | 4–5 | 0 | 0 |
| V | | 2 | 1.0 | 1.0 | | 11.38 | 142–149 | 5–6 | 0 | 0 |
| VI | 10 | 2 | | | 100 | 11.39 | 142–149 | 5 | 50 | 50 |

Table one shows that only by combining a urea-formaldehyde resin with resorcinol or 3,5-xylenol in the aqueous alkaline adhesive mix is there water resistant adhesive produced. The aqueous alkaline adhesive in all these examples containing wheat flour, rye flour, pearl starch, bentonite, sodium chloride, sodium sulfite, and a defoamer.

TABLE TWO

| Ex. No. | Soybean flour, g. | H₂O, g. | Defoamer, g. | NaOH, g. | Pearl starch, g. | Water, g. | "N" Silidate, g. | Resorcinol, g. | UF 111, g. | pH | Visc. | Single-face adhesion, percent | |
|---|---|---|---|---|---|---|---|---|---|---|---|---|---|
| | | | | | | | | | | | | F.F. | B.S. |
| VII | 30 | 144 | 1 | 4.8 | 70 | 125 | | | | 11.40 | 5 | 10 | 0 |
| VIII | 30 | 144 | 1 | 4.8 | 70 | 125 | 10 | | | 11.01 | 2½ | 10 | 0 |
| IX | 30 | 144 | 1 | 4.8 | 70 | 125 | 10 | 1 | | 10.78 | 2½ | 20 | 0 |
| X | 30 | 144 | 1 | 4.8 | 70 | 125 | 10 | 1 | 10 | 10.70 | 3 | 90 | 90 |

Contrasting Example X with Examples VIII and IX, a remarkable increase in water resistance is shown to be caused by the combined action of urea-formaldehyde resin and resorcinol on the alkaline-cereal flour mix.

The examples indicate that the addition of a small amount of resorcinol or the like to an alkaline-cereal flour-amino aldehyde resin adhesive system produces greatly enhanced wet strength in the bond of corrugated board and the like, and that such addition is particularly effective where a lower solids content adhesive is desired. The effect is quite noticeable where resorcinol is used in amount of 0.5% or more, based on the dry weight of the cereal flour and other solids of the adhesive. In fact one need not use more than 1% of resorcinol based on the weight of the dry adhesive solids to achieve a very high degree of wet strength in the bond. This result is unusual and surprising because of the low concentration of resorcinol used, and indicates a synergistic reaction occurs among the various resin, cereal flour, alkaline reactant and resorcinol ingredients. In contrast, the combination of lime, cereal flour, and resorcinol in the absence of UF resin produces no 24 hour wet strength. Neither does the cold-mixed combination of resorcinol, formaldehyde, cereal flour, and lime produce any wet strength.

With the above examples and considerations in view, the following generalized considerations can be made with respect to paper laminating adhesive characteristics of the present invention. With respect to these considerations, it must be kept in mind that commercial production requirements as to economics, adequate water resistance of the adhesive bond in a particular product, and overall simplicity and reliability under production conditions will permit wide variations as to ingredients and formulation concentrations. Generally, however, the foregoing examples and related test work indicate the following conclusions. The viscoidal, proteinaceous, starch containing primary material such as a cereal flour or the like can be as earlier defined, with or without appropriate addition of various additives to realize suitable viscosity and spreadability in a given application. In general such primary material has an adequate protein content to serve effectively as a carrier for the discrete starch and to satisfy the reaction requirement of the system in formation of a water resistant complex, and further has an adequate discrete starch content to give a satisfactory curing speed and also an acceptable bond strength. The alkaline reactant serving as an ingredient of the system can be as earlier defined, keeping in mind that appropriate selection of a given reactant is determined by such factors as cost, degree of water solubility and consequent desired degree of alkalinity and acceptable water resistance level sought in the adhesive bond. The resin constituent when used can be as earlier defined, also keeping in mind that the specific resin and concentration in a given adhesive system is affected by considerations of competitive cost and degree of water resistance sought, and also keeping in mind that even though some resins are not of themselves operable in an alkaline-cereal flour system, such as phenol formaldehyde and resorcinol formaldehyde, one facet of the present adhesive system involves small additive additions of resorcinol or the like to an amino-aldehyde resin with marked beneficiation of the water resistant properties of the adhesive. One of the advantages of the instant adhesive system is that such is capable of satisfactory water resistant properties and production speeds even at low order solids concentrations, with operable solids concentrations ranging generally from about 10% to about 50% based on the dry weight of the solids in the composition, and with suitable solids concentrations for corrugating applications being about 15% to about 35%, the ranges of concentrations in these regards being determined only by considerations of desired production speed and desired spreadability.

In terms of the concentration of the protein and starch constituencies in a wet mix characterizing our adhesive system, the protein content generally should be at least about 0.3% and preferably at least about 0.45% for corrugating purposes, when the starch content generally should be from about 5% to about 35%, and preferably from about 12% to about 30%, such concentrations being by weight, based on the total weight of the wet mix. The instant adhesive system is characterized by substantially alkalinity, obtained by addition of an alkali metal hydroxide or alkaline earth metal hydroxide with hydrogen ion concentrations ranging from about 9.0 to about 12.5 with the preferred pH range being from about 10.5 to about 12.0. The range of viscosity of the aqueous adhesive composition can range generally from about 5 centipoises to about 10,000 centipoises and for corrugating purposes from about 25 to about 400 centipoises and preferably from about 100 to about 220 centipoises, again depending upon acceptable solids concentrations and production speed at the lower viscosities and upon acceptable spreadability at the higher viscosities. Also the present adhesive system is capable of commercially acceptable gelatinization temperatures and has a characteristic relatively wide spread or range in this regard, such temperature spread being 5° F. to 10° F. in many instances and such gelatinization temperatures ranging as low as about 110° F. to even as high as about 160° F., with a range of from about 120° F., to about 150° F. being preferred for corrugating applications, the selection of a suitable gelatinization temperature range being determined by reasonable stability prior to and during use on one hand and by commercially adequate production speeds on the other hand. With the preferred gelatinization temperature range indicated, it has been determined that quite stable production conditions and excellent product quality can be maintained with the drying temperature at least about 350° F. and optimally about 375° F., and with the operating speed of the equipment at least about 300 feet per minute and optimally about 400 feet per minute.

From the foregoing, various further formulations, variations, modifications and adaptations of adhesive systems characterizing the present invention will readily occur to those skilled in the art within the scope of the following claims.

What is claimed is:
1. A dry, potentially adhesive composition adapted when in the form of an aqueous dispersion for use as a bonding agent for laminating paper and the like upon being subjected to heat in situ, said composition comprising:
 (a) as a first reactant; a finely divided, potentially adhesive, potentially viscoidal primary material having a protein content of at least about 3% by weight and an ungelatinized starch content of from about 50% to about 85% by weight, with said protein serving as a carrier for said ungelatinized starch when said material is in aqueous dispersion;
 (b) as a second reactant and starch gelatinization agent; a non-viscoidal, slightly water soluble alkaline reactant selected from the group consisting of alkali metal hydroxide forming materials, alkaline earth metal hydroxide forming materials, and mixtures thereof;
 (c) as a third reactant; a liquid, water soluble urea-aldehyde resin, and
 (d) as a fourth reactant; a beneficiation agent selected from the group consisting of resorcinol, 3,5-xylenol, and mixtures thereof;
 (e) said composition having a pH of at least about 9 when in an aqueous dispersion.

2. A composition according to claim 1, wherein said second reactant consists esentially of lime.

3. A composition according to claim 1, wherein said second reactant consists esentially of caustic soda.

4. A composition according to claim 1, wherein said third reactant consists essentially of urea-formaldehyde resin.

5. A composition according to claim 1, wherein said beneficiation agent consists essentially of resorcinol.

6. A composition according to claim 1, wherein said second reactant is present in the amount of at least about 2% by weight in proportion to the weight of the first reactant, said third reactant is present in the amount of at least about 5% by weight in proportion to said first reactant; and said fourth reactant is present in the amount of at least about 0.5% by weight in proportion to the weight of said first reactant.

7. A composition according to claim 1, wherein said first reactant is essentially cereal type flour selected from the group consisting of wheat flour, rye flour, oat flour, barley flour, millet flour, corn flour, sorghum flour, milo flour, pea flour, potato flour, and mixtures thereof.

8. A composition according to claim 7, wherein said cereal type flour is essentially of a particle size less than about 100 mesh.

9. A composition according to claim 7, wherein said primary material is at least principally wheat flour.

10. A composition according to claim 1, wherein said primary material is at least principally soybean flour and admixed ungelatinized starch.

11. A composition according to claim 1, wherein said first reactant is at least principally wheat flour, said second reactant is present in the amount of about 2% by weight in proportion to said first reactant, said third reactant is at least principally urea-formaldehyde resin present in the amount of at least about 5% by weight in proportion to said first reactant, and said fourth reactant is at least principally resorcinol present in the amount of at least about 0.5% by weight in proportion to said first reactant.

12. A composition according to claim 1, further comprising at least one additive ingredient selected from the group consisting of viscosity modifying agents, inorganic and organic filler materials, emulsive water repellants, wetting agents, and preservatives.

13. A wet mix, potentially adhesive composition for use as a bonding agent for laminating paper and the like upon being subjected to heat in situ, said composition comprising:
  (a) water, present in the amount of from about 50% to about 90% by weight of the wet mix;
  (b) as a first reactant; a finely divided, potentially adhesive, potentially viscoidal primary material having a protein content of at least about 3% by weight and an ungelatinized starch content of from about 50% to about 85% by weight, with said protein serving as a carrier for the ungelatinized starch constituent;
  (b) as a second reactant and starch gelatinization agent; a non-viscoidal, slightly water soluble alkaline reactant selected from the group consisting of alkali metal hydroxide, alkaline earth metal hydroxide and mixtures thereof;
  (c) as a third reactant; a liquid, water soluble urea-aldehyde resin; and
  (d) as a fourth reactant; a beneficiation agent selected from the group consisting of resorcinol, 3,5-xylenol, and mixtures thereof;
  (e) said composition having a pH of at least about 9.

14. A composition according to claim 13, wherein said second reactant consists essentially of calcium hydroxide.

15. A composition according to claim 13, wherein said second reactant consists essentially of sodium hydroxide.

16. A composition according to claim 13, wherein said third reactant consists essentially of urea-formaldehyde resin.

17. A composition according to claim 13, wherein said beneficiation agent consists essentially of resorcinol.

18. A composition according to claim 13, wherein said second reactant is present in the amount of at least about 2% by weight in proportion to the weight of the first reactant, said third reactant is present in the amount of at least about 5% by weight in proportion to said first reactant; and said fourth reactant is present in the amount of at least about 0.5% by weight in proportion to the weight of said first reactant.

19. A composition according to claim 13, wherein said first reactant is essentially cereal type flour selected from the group consisting of wheat flour, rye flour, oat flour, barley flour, millet flour, corn flour, sorghum flour, milo fluor, pea flour, potato flour, and mixtures thereof.

20. A composition according to claim 19, wherein said cereal type flour is essentially of a particle size less than about 100 mesh.

21. A composition according to claim 19, wherein said primary material is at least principally wheat flour.

22. A composition according to claim 13, wherein said primary material is at least principally soybean flour and admixed ungelatinized starch.

23. A composition according to claim 13, wherein said first reactant is at least principally wheat flour, said second reactant is present in the amount of about 2% by weight in proportion to said first reactant, said third reactant is at least principally urea-formaldehyde resin present in the amount of at least about 5% by weight in proportion to said first reactant, and said fourth reactant is at least principally resorcinol present in the amount of at least about 0.5% by weight in proportion to said first reactant.

24. A composition according to claim 13, further comprising at least one additive ingredient selected from the group consisting of viscosity modifying agents, inorganic and organic filler materials, emulsive water repellants, wetting agents, and preservatives.

25. A composition according to claim 13, adapted for bonding of corrugated board stock under commercial production conditions, wherein said composition has a pH of from about 10.5 to about 12, a viscosity of from about 25 to about 400 centipoises, a solids concentration of from about 15% to about 35% based on the dry weight of the solids in the composition and a gelatinization temperature range of from about 120° F. to about 150° F.

References Cited

UNITED STATES PATENTS

| | | | |
|---|---|---|---|
| 2,492,510 | 12/1949 | Van Epps | 260—6 |
| 2,872,421 | 3/1959 | Shelton et al. | 260—6 |
| 2,874,134 | 3/1959 | Gossett et al. | 260—6 |

OTHER REFERENCES

Chem. Abstract, vol. 49: 665g (Watanabe and Takakuwa).

WILLIAM H. SHORT, *Primary Examiner.*

E. M. WOODBERRY, *Assistant Examiner.*